(12) United States Patent
Heilper et al.

(10) Patent No.: US 7,222,791 B2
(45) Date of Patent: May 29, 2007

(54) COUNTERFEIT DETECTION METHOD

(75) Inventors: Andre Heilper, Haifa (IL); Ehud Karnin, Koranit (IL); Eugene Walach, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/813,459

(22) Filed: Mar. 30, 2004

(65) Prior Publication Data

US 2005/0218209 A1 Oct. 6, 2005

(51) Int. Cl.
*G06K 7/10* (2006.01)

(52) U.S. Cl. .................. 235/462.01; 235/385; 235/487

(58) Field of Classification Search ........... 235/462.01, 235/462.09, 375–380, 385, 470, 485–487; 705/26–28, 16, 37
See application file for complete search history.

(56) References Cited

U.S. PATENT DOCUMENTS

| | | | | |
|---|---|---|---|---|
| 5,063,507 A * | 11/1991 | Lindsey et al. ................ 705/26 |
| 5,521,815 A * | 5/1996 | Rose, Jr. ....................... 705/28 |
| 5,541,394 A * | 7/1996 | Kouchi et al. ............... 235/375 |
| 5,758,126 A * | 5/1998 | Daniels et al. ............... 345/780 |
| 5,841,116 A * | 11/1998 | Lewis ......................... 235/375 |
| 6,085,176 A * | 7/2000 | Woolston ...................... 705/37 |
| 6,415,982 B2 * | 7/2002 | Bridgelall et al. ..... 235/472.01 |
| 6,442,276 B1 * | 8/2002 | Doljack ........................ 380/51 |
| 6,456,729 B1 * | 9/2002 | Moore ......................... 382/103 |
| 6,463,420 B1 * | 10/2002 | Guidice et al. ................ 705/28 |
| 6,547,137 B1 * | 4/2003 | Begelfer et al. ............. 235/385 |
| 6,820,201 B1 * | 11/2004 | Lincoln et al. .............. 713/179 |
| 6,880,753 B2 * | 4/2005 | Ogihara et al. .............. 235/385 |
| 6,885,286 B2 * | 4/2005 | Franks ........................ 340/5.8 |
| 6,996,543 B1 * | 2/2006 | Coppersmith et al. ........ 705/50 |
| 2001/0047340 A1 * | 11/2001 | Snow et al. ................... 705/58 |
| 2001/0049606 A1 * | 12/2001 | Lucarelli ......................... 705/1 |
| 2002/0032626 A1 * | 3/2002 | DeWolf et al. ................ 705/35 |
| 2002/0133703 A1 * | 9/2002 | Morgan ....................... 713/170 |
| 2002/0147650 A1 * | 10/2002 | Kaufman et al. .............. 705/22 |
| 2002/0161745 A1 * | 10/2002 | Call ............................... 707/1 |
| 2002/0165741 A1 * | 11/2002 | Becker et al. .................. 705/4 |
| 2003/0050891 A1 * | 3/2003 | Cohen .......................... 705/42 |
| 2003/0141358 A1 * | 7/2003 | Hudson et al. ............. 235/375 |
| 2003/0220841 A1 * | 11/2003 | Maritzen ...................... 705/26 |
| 2004/0015700 A1 * | 1/2004 | Kokenyesi .................. 713/179.1 |
| 2004/0024782 A1 * | 2/2004 | Chamberlain ............ 707/104.1 |
| 2004/0054888 A1 * | 3/2004 | Chester ....................... 713/155 |
| 2004/0059737 A1 * | 3/2004 | Beck et al. .................. 707/100 |
| 2004/0268130 A1 * | 12/2004 | Pretorius ..................... 713/179 |
| 2005/0114270 A1 * | 5/2005 | Hind et al. .................... 705/64 |
| 2005/0199706 A1 * | 9/2005 | Beck et al. .................. 235/380 |

* cited by examiner

*Primary Examiner*—Thien M. Le
*Assistant Examiner*—Edwyn Labaze
(74) *Attorney, Agent, or Firm*—Stephen C. Kaufman

(57) ABSTRACT

A counterfeit detection method includes electronically reading a label on a desired item in a store, transmitting an item identification code encoded in the read label to an authentication unit, receiving an indication from the authentication unit whether or not the item identification code is registered to the store and if the indication is positive, generating a certificate of authenticity for the desired item.

7 Claims, 2 Drawing Sheets

COUNTERFEIT DETECTION METHOD

FIELD OF THE INVENTION

The present invention relates to anti-counterfeit tracking devices generally.

BACKGROUND OF THE INVENTION

Every year, the retail industry loses money to the production of counterfeit designer products. Counterfeit items are often very hard to reveal, as they are copied so well it is often difficult to tell the difference between the copy and an original. Many tools and techniques have been proposed to protect against counterfeiting, including difficult to copy labels and hidden signs on the actual product. These techniques have not been extremely successful, however, because counterfeiters are extremely skillful in copying even difficult labels, and hidden signs in the product are hidden so well that they become inaccessible.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
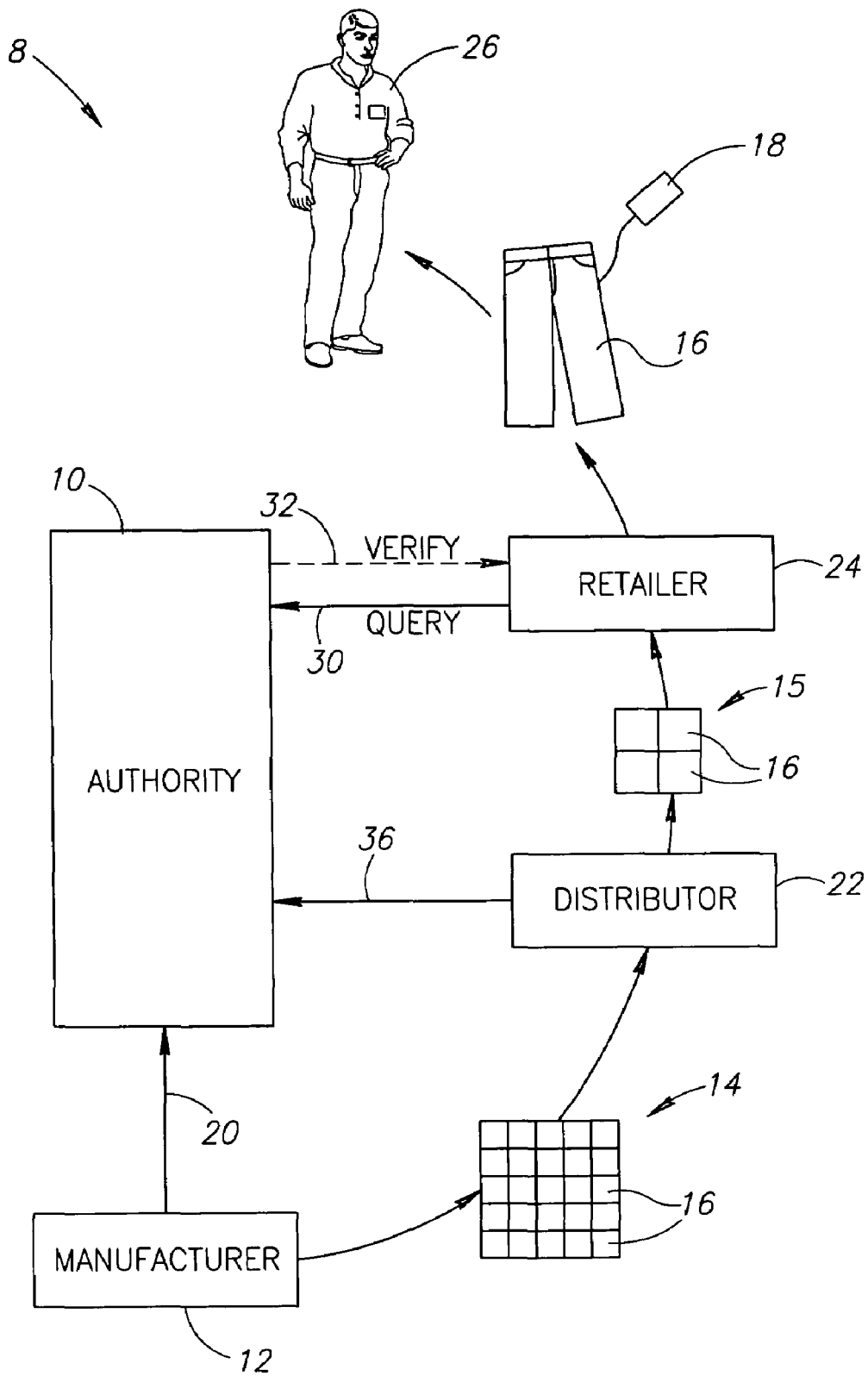
FIG. 1 is a schematic illustration of a counterfeit tracking method, operative in accordance with the present invention.

It may be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it may be understood by those skilled in the art that the present invention may be practiced without these specific details. In other instances, well-known methods, procedures, and components have not been described in detail so as not to obscure the present invention.

Figure 2:
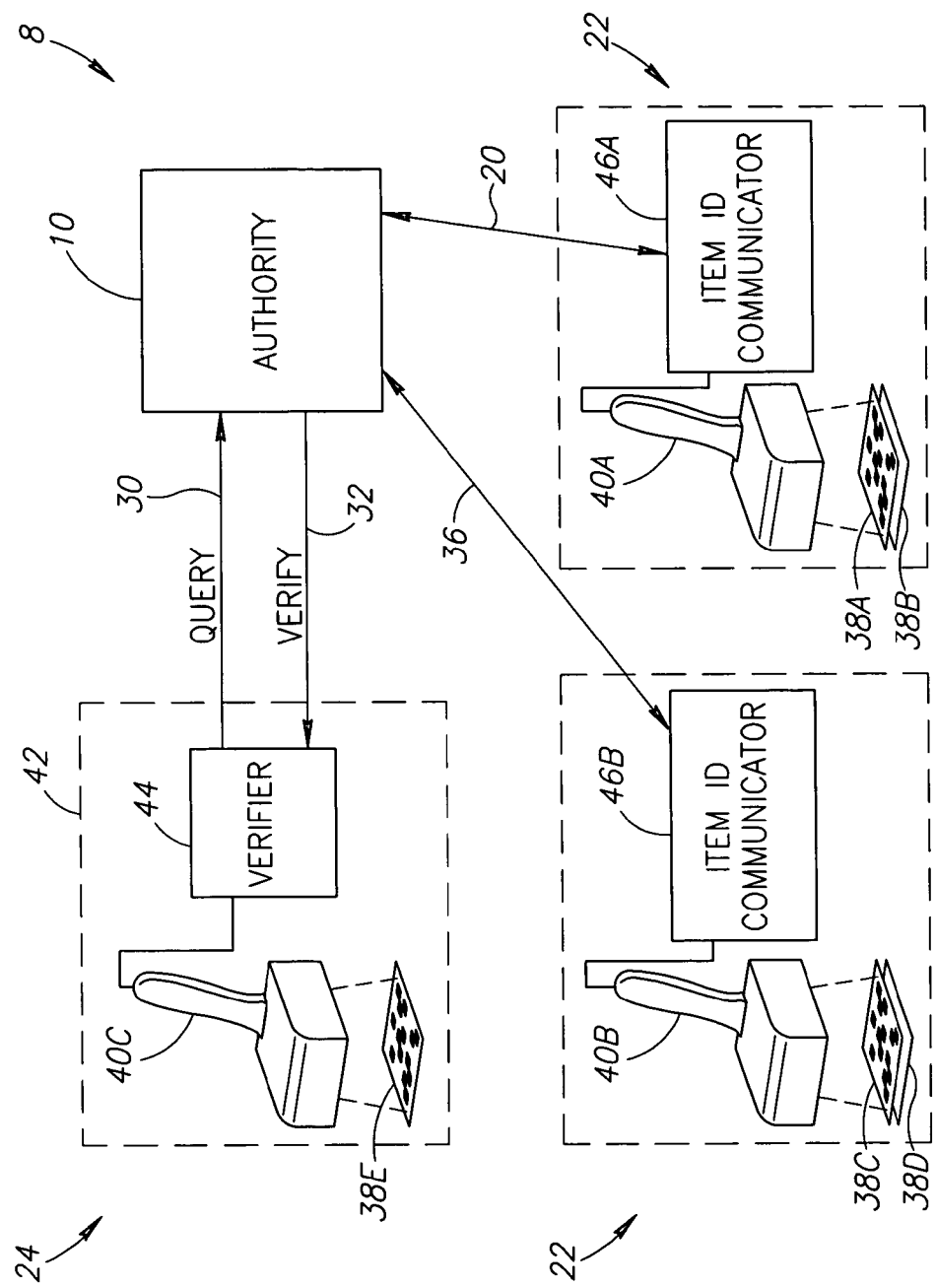
FIG. 2 is a schematic illustration of a counterfeit tracking system implementing the method of FIG. 1.

The present invention is a counterfeit detection method that attempts to address the two main problems, discussed in the Background, with current anti-counterfeit systems. Reference is now made to FIGS. 1 and 2, which respectively illustrate a counterfeit detection method, operative in accordance with a preferred embodiment of the present invention, and a system 8 for implementing it. System 8 comprises a third party authority for counterfeit detection 10, which may be similar to a credit-card verification bureau, a code reader 40A at a manufacturer 12, a code reader 40B at a distributor 22, and a point of service (POS) unit 42, which may be located at a retailer 24 and which may comprise a code reader 40C.

In the present invention, manufacturer 12 may produce a series 14 of items 16. Each item 16 may be assigned unique article number (UAN) 18. During the course of production UAN 18 may be encoded and printed on a label attached to item 16. The label typically may be clearly visible to anyone viewing the item.

UAN 18 may be encoded in any suitable form. In the exemplary embodiment of FIG. 2, for example, UAN 18 is shown encoded in a two-dimensional bar code 38 and code readers 40A–40C are shown as bar code readers. Barcode 38 may be read by any of code readers 40A–C located at manufacturer 12, distributor 22 and retailer 24, respectively. Code readers 40 may be any type of code reader.

The following discussion will describe the present invention using a bar code encoding process. However, it will be appreciated that UAN 18 may be encoded using many different types of encoding processes, such as the following non-limiting examples: a one dimensional bar code, a two-dimensional bar code, an RFID tag to be read with an RFID reader or a magnetic stripe. A magnetic stripe may be readable by current credit card readers. Alternatively, UAN 18 may be printed as a number, with no encoding. The latter may be readable using optical character recognition (OCR) technology.

In accordance with a preferred embodiment of the present invention, entities involved in the process of bringing authentic items 16 for sale to end customers may register ownership of authentic items 16 with authority 10. The end customer may then utilize POS unit 42 to verify that a desired item is indeed authentic and registered to the entity from which the end customer either intends to buy or has already bought.

The process may operate as follows: Manufacturer 12 may register (step 20) a series 14 of manufactured items 16 with authority 10. In the embodiment shown in FIGS. 1 and 2, this is done by scanning bar codes 38 through code reader 40A and sending the decoded UAN information to authority 10.

Alternatively, manufacturer 12 may not be required to scan every item 16 in series 14. Because UANs 18 may be a batch of consecutive serial numbers, manufacturer 12 may simply scan bar code 38A of the first item 16A in series 14 and bar code 38B of the last item 16B in series 14. If series 14 contains 10,000 items, for example, code reader 40A at manufacturer 12 may scan bar codes 38A of item number 10,001 and bar code 38B of item number 20,000. Authority 10 may understand this to mean 10,000 items should be registered to manufacturer 12, and may register the UANs 18 of the entire series 14 of 10,000 items as being owned by distributor 22.

Further alternatively, manufacturer 12 may not bother to scan the UANs 18 at all. Since manufacturer 12 may provide UANs 18 to items 16 and since manufacturer 12 may decide which items to ship to which distributors, manufacturer 12 may send a listing of the items in series 14 directly to authority 10 without scanning the items first.

Manufacturer 12 may then ship series 14 of items 16 to distributor 22. Distributor 22 may then ship a batch 15 from series 14 that it received from manufacturer 12 to retailer 24.

Distributor 22 may then notify authority 10 that it has shipped batch 15 of items 16 to retailer 24 and authority 10 may update (step 36) its registry accordingly. This may be done by having code reader 40B, attached to distributor 22, scan bar code 38C and bar code 38D, attached to the first and last serially numbered items in batch 15, or by directly providing a listing without scanning. The entire batch 15 of items 16 may now be registered in authority 10 as available for sale by retailer 24 only.

This may be done a multiplicity of times, as distributor 22 may apportion series 14 into many batches, to be distributed to a multiplicity of retailers. At each stage of shipment and distribution of products, authority 10 may verify that distributor 22 is entitled to perform the shipment, and that the items 16 in the shipment are not counterfeit.

At the time of purchase, code reader 40C attached to retailer 24 may read bar code 38E on the label of item 16. When a customer 26 wishes to purchase an item, say item 16E, customer 26 may scan bar code 38E on item 16E with bar code reader 40C, a portion of POS unit 42. POS unit 42 may send a query 30 to authority 10 requesting a verification of whether or not item 16E is original, and available for sale by retailer 24. Authority 10 may then check its records, according to the flow of data it has received. If the records so indicate, authority 10 may then send (step 32) a verification to POS 42, verifying that item 16 is a non-counterfeit original, and is available for sale by retailer 24.

Customer 26 may view query 30 and verification 32 at POS unit 42, so that customer 26 may be assured that item 16E is an original. Additionally, a printed certificate of authenticity may be printed out for customer 26 by POS 42, so that proof of authenticity may be retained. The proof of authenticity may be on the sales receipt or on a separate printout.

Once the sale has been consummated, POS 42 may indicate so to authority 10 and authority 10 may update its records, indicating that item 16E is no longer for sale. If customer 26 returns item 16E, POS 42 or another code reader 40 may update authority 10 that item 16E is once again for sale.

Customer 26 may also directly connect to authority 10 to verify that item 16E is authentic. Authority 10 may ask for sales data (such as UAN 18) listed on a sales receipt and may provide verification therefrom.

It may appreciated that all tracking of details, verifications and proving of authenticity is done by authority 10, which may be a third-party authority, and all communications may be done through a secure, electronic method. In one embodiment, there is a network connection between each code reader 40 and authority 10. The network may be any suitable network, such as a wired network, the Internet, a satellite network, etc.

It will be appreciated that, with the present invention, a counterfeit item may still be made. In fact, the labels on which the UAN 18 (in whatever form it may be encoded) are placed may be easy to reproduce. However, even if a counterfeiter successfully reproduces a label, he may still be caught since the copied UAN 18 will not be registered with authority 10 and thus, the counterfeit item will not receive a certificate of authenticity.

Authority 10 may be any type of system, such as a database or other storage device, which stores records for each item registered with it. Each record may comprise UAN 18, its current 'owner' and a flag indicating whether or not the item has been sold to customer 26. Authority 10 may operate similarly to a credit card verification bureau in that it may verify data in its system. However, authority 10 may also update its information, as the items registered to it are transferred from one owner to another.

It will be appreciated that authority 10 may provide a method of registering or transferring ownership of goods, parallel to the physical transfer of goods from one owner to the next. Since communication with authority 10 may be along electronically secure channels (or generally secure channels), the electronic transfer of ownership may be secure. This may help to make the physical transfer of ownership also secure, since the proof of ownership may reside in authority 10 and not in any physical bills of transfer.

Moreover, proof of ownership may be produced at any time and not just by POS unit 42. The latter may be operative to provide proof of ownership to customer 26. However, authority 10 may be able to provide proofs of ownership to the current owner of an item or group of items 16.

The units at manufacturer 12 and distributor 22 may comprise bar code reader 40 and an item identification communicator unit 46. Bar code reader 40 may read bar codes 38. Unit 46 may, at least, analyze and decode scanned bar code 38, may generate the associated UAN 18 and may communicate with authority 10 indicating that UAN 18 is to be transferred from it to a new owner.

POS unit 42 may be any suitable unit. Like the units at manufacturer 12 and distributor 22, it may comprise bar code reader 40C and another unit. However, for POS unit 42, the extra unit is a verifier 44 which, in addition to the communication activities of communicator units 46, may also communicate with authority 10 indicating that UAN 18 was read at its store and if certification is received, may print such a certificate.

In another example, POS unit 42 may be based on a SureMark TI-8 point of sale unit, commercially available from International Business Machines, Inc. The SureMark TI-8 handles many aspects of a sale, such as printing a receipt, scanning a check electronically, etc. The SureMark TI-8 may be modified in the present invention to scan a label having bar code 38 on it (which may be detachable), to analyze and decode bar code 38, to generate associated UAN 18, to communicate with authority 10 indicating that UAN 18 was read at its store, to receive certification of authenticity and, if such certification is received, to print such a certificate.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

What is claimed is:

1. A counterfeit detection method comprising:
   reading a label attached to a manufactured item, said label incorporating a manufacturer-controlled identification number;
   with said identification number, querying a third party authority to verify that a retailer of said item received title to said item from a chain of non-consumer owners beginning with its indicated manufacturer; and
   indicating that said item is not counterfeit if said retailer received title to said item from said chain.

2. The method according to claim 1 and wherein said reading comprises scanning said label with a bar code reader.

3. The method according to claim 1 wherein said identification number is encoded in said label and wherein said encoded number is one of the following code types: one-dimensional bar code, two-dimensional bar code, RFID tag and a magnetic tag.

4. A method according to claim 1 and wherein a database maintained by said third party authority stores identities of commercial entities to whom said items are sold from manufacture until point of sale.

5. A point of sale unit in a store, the unit comprising:
    a reader to read a label attached to a manufactured item, said label incorporating a manufacturer-controlled identification number;
    a verifier to query a third party authority with said identification number to verify that said store received title to said item from a chain of non-consumer owners beginning with its indicated manufacturer; and
    a printer to indicate that said item is not counterfeit if said retailer received title to said item from said chain.

6. The unit according to claim 5 and wherein said reader comprises one of the following readers: a one-dimensional bar code reader, a two-dimensional bar code reader, an RFID tag reader, and a magnetic tag reader.

7. A counterfeit detection method comprising:
    maintaining a database for cataloguing;
        manufactured items identified by manufacturer-controlled identification numbers; and
        commercial entities to which said items are sold from manufacture until point of sale;
    receiving a query from a store regarding a particular one of said identification numbers wherein said particular identification number is associated with a particular one of said items; and
    indicating that said item is not counterfeit if said store is recorded in said database as owning said particular item.

* * * * *